United States Patent
Freese et al.

(10) Patent No.: US 9,285,143 B2
(45) Date of Patent: Mar. 15, 2016

(54) ARRANGEMENT OF A THERMOELECTRIC HEAT PUMP

(71) Applicant: Dr. Ing. h.c. F. Porsche Aktiengesellschaft, Stuttgart (DE)

(72) Inventors: Bastian Freese, Ostfildern (DE); Maik-Uwe Zillich, Stuttgart (DE); Reyk Bienert, Eberdingen (DE); Robert Fleischhacker, Magstadt (AT)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 365 days.

(21) Appl. No.: 14/030,549

(22) Filed: Sep. 18, 2013

(65) Prior Publication Data

US 2014/0075962 A1    Mar. 20, 2014

(30) Foreign Application Priority Data

Sep. 18, 2012   (DE) .......................... 10 2012 108 793

(51) Int. Cl.
*F25B 21/04* (2006.01)
*B60H 1/00* (2006.01)

(52) U.S. Cl.
CPC ............ *F25B 21/04* (2013.01); *B60H 1/00278* (2013.01); *B60H 1/00478* (2013.01)

(58) Field of Classification Search
CPC .. F25B 21/04; B60H 1/00478; B60H 1/00278
See application file for complete search history.

(56) References Cited

U.S. PATENT DOCUMENTS

| | | | |
|---|---|---|---|
| 7,975,637 B1* | 7/2011 | Nida | 114/211 |
| 9,038,400 B2 | 5/2015 | Goenka | |
| 2006/0086114 A1 | 4/2006 | Nishiyama et al. | |
| 2008/0230618 A1* | 9/2008 | Gawthrop | 237/12.3 B |
| 2010/0287952 A1 | 11/2010 | Goenka | |
| 2010/0313575 A1* | 12/2010 | Goenka et al. | 62/3.3 |
| 2012/0079837 A1* | 4/2012 | Maranville et al. | 62/3.61 |
| 2012/0240882 A1* | 9/2012 | Gao et al. | 123/41.55 |
| 2014/0053584 A1 | 2/2014 | Tschismar | |

FOREIGN PATENT DOCUMENTS

| | | |
|---|---|---|
| CN | 102576232 | 7/2012 |
| DE | 10 2005 036 492 | 3/2006 |
| DE | 10 2009 039 681 | 3/2011 |
| EP | 2 357 102 | 8/2011 |
| JP | 2011185574 | 9/2011 |

OTHER PUBLICATIONS

Japanese Patent Application No. 2013-186257—Office Action dated Sep. 22, 2014.
German Search Report of Sep. 2, 2013.

* cited by examiner

*Primary Examiner* — Emmanuel Duke
(74) *Attorney, Agent, or Firm* — Gerald E. Hespos; Michael J. Porco; Matthew T. Hespos

(57) ABSTRACT

An arrangement of a thermoelectric heat pump in at least one first fluid circuit, one second fluid circuit and one third fluid circuit is provided for a motor vehicle. The arrangement has a first heat exchanger provided for exchange of heat between a fluid of the first fluid circuit and a fluid of a third fluid circuit, and a second heat exchanger is provided for the exchange of heat between a fluid of the second fluid circuit and the fluid of the third fluid circuit. In each case one thermoelectric element is arranged between the heat exchange regions of the first heat exchanger and between the heat exchange regions of the second heat exchanger.

11 Claims, 3 Drawing Sheets

ARRANGEMENT OF A THERMOELECTRIC HEAT PUMP

CROSS REFERENCE TO RELATED APPLICATION

This application claims priority under 35 USC 119 to German Patent Appl. No. 10 2012 108 793.8 filed on Sep. 18, 2012, the entire disclosure of which is incorporated herein by reference.

BACKGROUND

1. Field of the Invention

The invention relates to a thermoelectric heat pump in at least one first fluid circuit and one second fluid circuit for a motor vehicle.

2. Description of the Related Art

The heating of the passenger cabin of a motor vehicle is a factor relevant to the driving comfort of the occupants.

An electrically driven vehicle has a drive machine in the form of an electric motor that does not generate as much waste heat as the internal combustion engine of a vehicle driven purely by an internal combustion engine. Additionally, hybrid vehicles typically have smaller internal combustion engines that may produce less waste heat. Thus, adequate heating of the passenger cabin of a hybrid vehicle remains a problem to be solved.

EP 2 357 102 A1 discloses a vehicle with a fluid circuit with a heat exchanger that is coupled by a first thermoelectric heat pump element to the passenger region and by a second thermoelectric heat pump element to a heat exchanger with respect to the ambient air. The heat pump elements can be controlled to realize a targeted dissipation of the heat from the fluid circuit to the ambient air or to the passenger region.

The configuration of EP 2 357 102 A1, however, realizes only a distribution of the available heat in a fluid circuit. The system of EP 2 357 102 A1 is not well suited for a vehicle that has different fluid circuits for cooling or temperature control of different assemblies, such as fluid circuits used for temperature control of the passenger cabin.

It is an object of the invention to provide a simple thermoelectric heat pump arrangement in at least first and second fluid circuits of a motor vehicle that enables adequate temperature control of the passenger cabin. It is also an object of the invention to provide a method for controlling such a thermoelectric heat pump arrangement.

SUMMARY OF THE INVENTION

The invention relates to a thermoelectric heat pump arrangement provided in at least first, second and third fluid circuits for a motor vehicle. More particularly, a first heat exchanger is provided for exchange of heat between fluid of the first fluid circuit and fluid of a third fluid circuit, and a second heat exchanger is provided for exchange of heat between fluid of the second fluid circuit and the fluid of the third fluid circuit. A thermoelectric element is arranged between the heat exchange regions of the first heat exchanger and between the heat exchange regions of the second heat exchanger. In this way, the exchange of heat from the first and/or second fluid to the third fluid can be controlled so that the third fluid can be temperature-controlled or heated and used, for example, to heat the passenger compartment.

The arrangement may further provide at least one fourth fluid circuit and at least one third heat exchanger for the exchange of heat between a fluid of the fourth fluid circuit and the fluid of the third fluid circuit. The incorporation of the fluid of the fourth circuit enables the exchange of heat to the third fluid to be optimized.

A thermoelectric element preferably is arranged between the heat exchange regions of the third heat exchanger to control the exchange of heat from the fourth fluid to the third fluid.

The first heat exchanger may have a valve for controlling the flow of the fluid of the third circuit through the first heat exchanger, and/or the second heat exchanger may have a valve for controlling the flow of the fluid of the third circuit through the second heat exchanger, and/or the at least one third heat exchanger may have a valve for controlling the flow of the fluid of the third circuit through the at least one third heat exchanger. The respective valve controls the flow through the heat exchanger and thus also controls the amount of heat exchanged.

The first heat exchanger may have a valve for controlling the flow of the fluid of the first circuit through the first heat exchanger, and/or the second heat exchanger may have a valve for controlling the flow of the fluid of the second circuit through the second heat exchanger, and/or the at least one third heat exchanger may have a valve for controlling the flow of the fluid of the fourth circuit through the at least one third heat exchanger. The respective valve controls the flow through the heat exchanger and thus also controls the amount of heat exchanged.

The at least one valve of the valves may be arranged upstream and/or downstream of the heat exchanger in terms of the fluid flow.

The valve may be a throttle valve that controls the throughflow rate through the respective heat exchanger.

The thermoelectric element may be a Peltier element. In this way, the exchange of heat can be controlled through targeted actuation.

The thermoelectric element may be electrically and/or electronically actuable. Targeted electric and/or electronic actuation enables the exchange of heat to the third fluid to be controlled to optimize the heating, for example of the passenger compartment.

The first, second and/or third heat exchangers may be in a housing.

The first, second and/or third heat exchangers may be arranged in parallel and/or in series with respect one another in terms of the fluid flow of the third circuit. In this way, all of the heat exchangers can be arranged in parallel or in series. However, it also is possible for a proportion of the heat exchangers to be arranged or connected in series and for another proportion of the heat exchangers to be arranged or connected in parallel.

The invention also relates to a method for controlling of the above-described thermoelectric heat pump arrangement. The method enables the at least one thermoelectric element and/or the at least one valve to be controlled so that the exchange of heat from at least one fluid to the third fluid satisfies predefined criteria of the required heating power and/or of the available amount of heat in each connected fluid circuit.

The control preferably is performed so that a setpoint temperature for the third fluid for the heating of the passenger cabin is attained through selection and actuation of the thermoelectric elements and/or valves.

The invention will be explained in more detail below on the basis of at least one exemplary embodiment and with reference to the drawings.

DETAILED DESCRIPTION OF THE PREFERRED EMBODIMENTS

Figure 1:
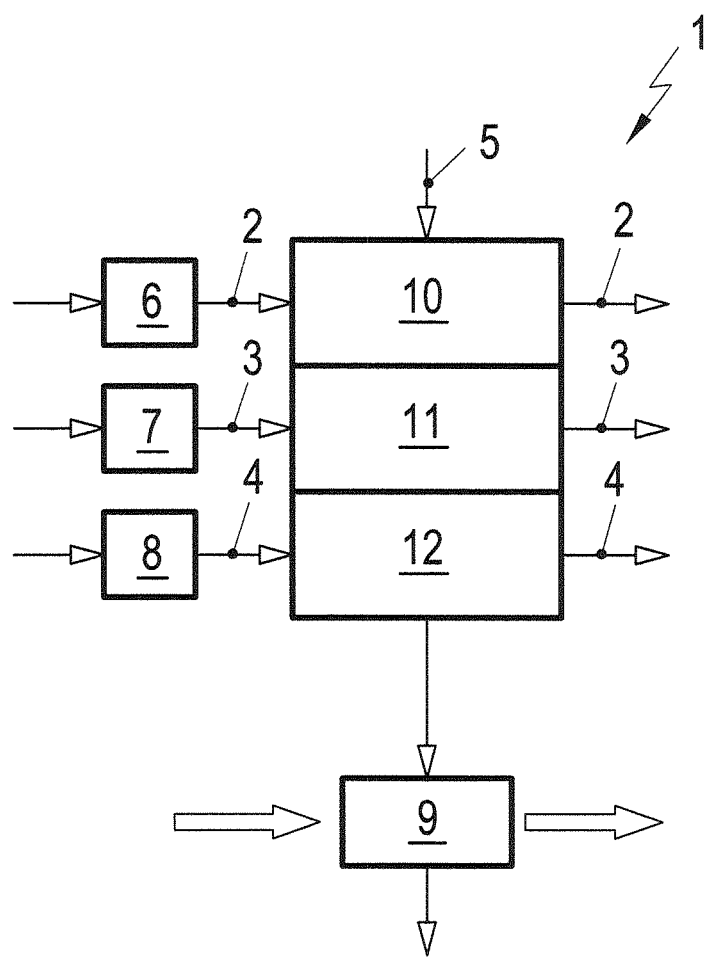
FIG. 1 is a schematic illustration of an arrangement of a thermoelectric heat pump in a circuitry configuration of multiple fluid ducts.

FIG. 1 schematically illustrates an arrangement with a thermoelectric heat pump 1 in a circuitry having a multiplicity of fluid circuits 2, 3, 4 and 5. The fluid circuits 2, 3, 4 have heat source 6, 7, 8 respectively, so that the fluid flowing in the fluid circuits 2, 3, 4 is heated by the respective heat source 6, 7, 8. The fluid in the fluid circuit 5 is heated by exchange of heat from the fluid in the fluid circuits 2, 3, 4 to the fluid in the fluid circuit 5. The heated fluid is used with a further heat exchanger 9 to heat air flowing into the passenger compartment of the motor vehicle.

The thermoelectric heat pump 1 is formed by three heat exchangers 10, 11 and 12. The heat exchanger 10 performs an exchange of heat between the fluid of the fluid circuit 2 and the fluid of the fluid circuit 5. The heat exchanger 11 performs an exchange of heat between the fluid of the fluid circuit 3 and the fluid of the fluid circuit 5. The heat exchanger 12 performs an exchange of heat from the fluid of the fluid circuit 4 to the fluid of the fluid circuit 5.

Each heat exchangers 10, 11, 12 of the thermoelectric heat pump 1 preferably has a thermoelectric element that controls the exchange of heat between the fluids involved. The exchange of heat from an inlet-side fluid to the outlet-side fluid of the fluid circuit 5 can be performed in a targeted manner by an electric or electronic actuation of the respective thermoelectric element.

Figure 2:
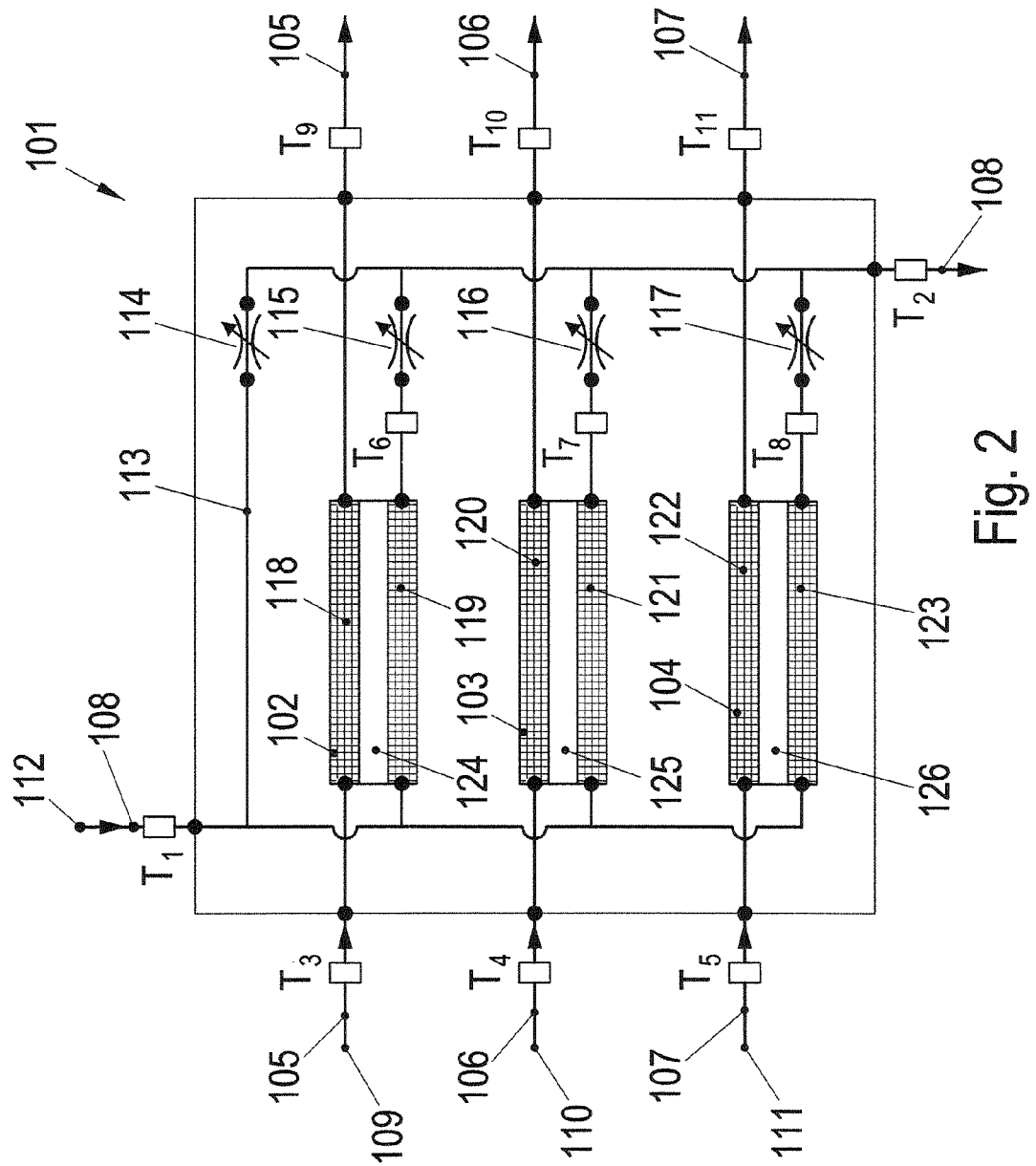
FIG. 2 is a schematic illustration of an arrangement of a thermoelectric heat pump in a circuitry configuration of multiple fluid ducts.

FIG. 2 shows a schematic view of a thermoelectric heat pump 101 that is equipped with three heat exchangers 102, 103, 104. At the inlet side, the thermoelectric heat pump 101 is connected to the fluid circuits 105, 106 and 107, and a further fluid circuit 108 is connected to the thermoelectric heat pump 101.

Heat sources preferably are arranged in the fluid circuits 105, 106, 107 so that the fluid 109 of the fluid circuit 105 is heated by the heat sources. The fluid 109 enters into the heat exchanger 102 at a temperature T3 and exits the heat exchanger 102 and the thermoelectric heat pump 101 at a temperature T9. The fluid 110 of the fluid circuit 106 is heated by a heat source in the fluid circuit 106 and enters the heat exchanger 103 or the thermoelectric pump 101 at a temperature T4. The fluid 110 exits the heat exchanger 103 or the thermoelectric heat pump 101 again at a temperature T10. The fluid 111 of the fluid circuit 107 is heated by a heat source. Fluid 111 enters the heat exchanger 104 at the temperature T5, and exits said heat exchanger 104 or the thermoelectric heat pump 101 at a temperature T11.

A fluid 112 of the fluid circuit 108 enters the thermoelectric heat pump 101 at a temperature T1, and, on the one hand, can flow past the heat exchangers 102, 103 and 104 via the bypass 113 and the valve 114, such that said fluid exits the thermoelectric heat pump 101 at a temperature T2.

Alternatively, the fluid 112 may flow through the heat exchanger 102 and/or through the heat exchanger 103 and/or through the heat exchanger 104 based on control by the valves 115, 116, 117. Here, the fluid 112 exits the heat exchanger 102 at a temperature T6, exits the heat exchanger 103 at a temperature T7, and/or exits the heat exchanger 104 at a temperature T8. The valves 114, 115, 116 and 117 are controlled to control the fluid flow rate of the fluid 112 passing through the bypass 113 and/or through the heat exchanger 102 and/or through the heat exchanger 103 and/or through the heat exchanger 104.

The heat exchangers 102, 103, 104 have first heat exchange regions 118, 120 and 122 respectively and second heat exchange regions 119, 121 and 123 respectively. The fluid 109 of the fluid circuit 105 flows through the heat exchange region 118. The fluid 112 flows through the second heat exchange region 119 of the first heat exchanger 102.

Correspondingly, the fluid 110 flows through the heat exchange region 120 of the heat exchanger 103, while the fluid 112 flows through the heat exchange region 121 of the heat exchanger 103.

The fluid 111 flows through the heat exchanger 104 in the heat exchange region 122, while the fluid 112 flows through the heat exchanger 104 in the heat exchange region 123.

In the exemplary embodiment of FIG. 2, one thermoelectric element 124 is arranged between the heat exchange regions 118, 119 of the heat exchanger 102, one thermoelectric element 125 is arranged between the heat exchange regions 120, 121 of the heat exchanger 103 and one thermoelectric element 126 is arranged between the heat exchange regions 122, 123 of the heat exchanger 104. Heat flow between the heat exchange regions 118, 119 and 120, 121 and 122, 123 respectively can be controlled by actuation of the respective thermoelectric element 124, 125, 126. In other exemplary embodiments, at least one of the heat exchangers may have no thermoelectric element.

The valves 114 to 117 are arranged in the fluid circuit 108 for controlling the fluid flow 112. In the exemplary embodiment, the valves are downstream of the respective heat exchanger 102, 103, 104 in terms of the fluid flow, and the valve 114 is arranged in the bypass 113. Alternatively, a corresponding valve may also be positioned upstream of the respective heat exchanger. It is also possible for some valves to be positioned upstream of the heat exchanger and for others to be positioned downstream of the respective heat exchanger.

It is also possible for a respective valve to be arranged in the fluid circuits 105, 106, 107 to control the fluid flow 109, 110, 111 through the thermoelectric heat pump 101 or the heat exchangers 102, 103, 104 arranged therein.

Figure 3:
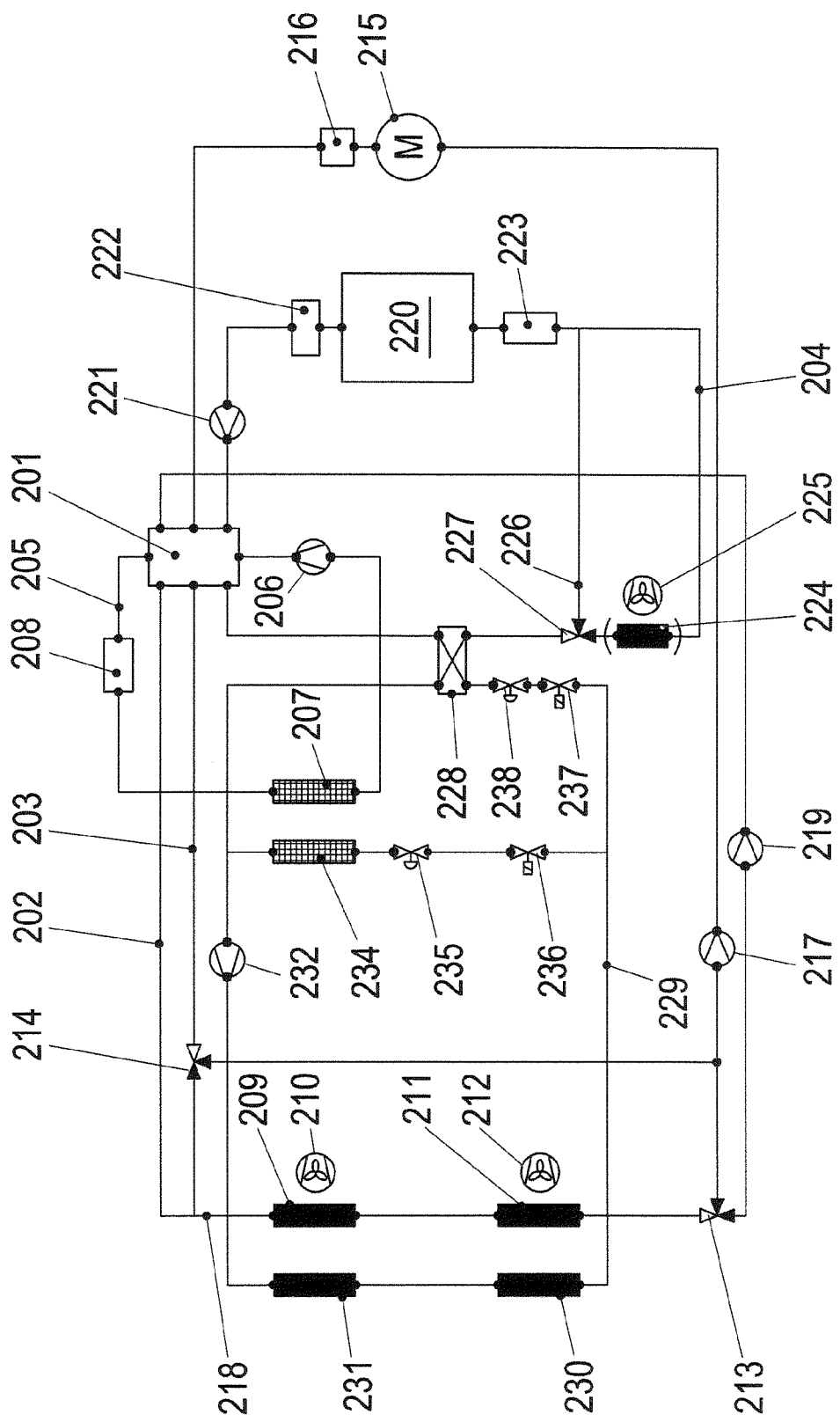
FIG. 3 is a schematic illustration of an arrangement of a thermoelectric heat pump in a circuitry configuration of multiple fluid ducts.

FIG. 3 shows an arrangement of a thermoelectric heat pump 201 in a circuitry configuration with a first fluid circuit 202, a second fluid circuit 203, a third fluid circuit 204 and a fourth fluid circuit 205.

The fluid circuits 202, 203 and 204 correspond to the fluid circuits 105, 106, 107, and 2, 3, 4, of FIGS. 1 and 2 respectively. The fluid circuit 205 corresponds to the fluid circuits 5 and 108 respectively. The fluid circuit 205 constitutes the fluid circuit for heating the passenger compartment and comprises a pump 206, a heating heat exchanger 207 for heating the air that flows into the passenger compartment, and optionally an electric heater 208 with PTC type of construction with a high-voltage PTC auxiliary heater. The heat exchanger 207 may be a heating heat exchanger that is arranged in an air-conditioning unit arrangement of an air-conditioning system. Heat is transmitted by the thermoelectric heat pump 201 from the fluid circuits 202, 203 and 204 to the fluid circuit 205 to heat the passenger compartment of the vehicle.

The first fluid circuit 202 has a first heat exchanger 209 with a fan 210 and a second heat exchanger 211 with a fan 212, and is connected in terms of flow to a circuit 203 via the valves 213, 214. The drive motor 215 of the vehicle has a control unit 216 and a pump 217 in the circuit 203. The fluid circuit 202 has a branch 218, valves 213 and 214, and a pump 219 for circulating the fluid in the fluid circuit.

The fluid circuit 204 is for cooling the battery 220 and comprises a pump 221, a charging unit 222 and the battery 220, which may be a high-voltage battery. A high-voltage PTC auxiliary heater 223 may be connected downstream of the battery 220 and may function for heating. The circuit 204 further has a heat exchanger 224 with fan 225 that can be bypassed by flow through the bypass 226 and the valve 227. A second heat exchanger 228 also is arranged in the circuit 204 and functions for the exchange of heat between the circuit 204 and the refrigerant circuit 229 of the air-conditioning system. The second heat exchanger 228 is also referred to as a chiller and is a liquid-liquid heat exchanger between the coolant of the coolant circuit 204 and the refrigerant of the refrigerant circuit 229. The refrigerant circuit 229 preferably has two condensers 230, 231 and a refrigerant compressor 232 that pumps the refrigerant as fluid in the circuit. An evaporator 234, an expansion valve 235 and a control valve 236 also are provided in the circuit 229. Valves 237, 238 are arranged in the branch of the second heat exchanger 228.

What is claimed is:

1. A thermoelectric heat pump arrangement in at least one first fluid circuit, one second fluid circuit and one third fluid circuit for a motor vehicle, comprising a first heat exchanger disposed for exchanging heat between a fluid of the first fluid circuit and a fluid of a third fluid circuit, a second heat exchanger disposed for exchanging heat between a fluid of the second fluid circuit and the fluid of the third fluid circuit, and thermoelectric elements arranged respectively between heat exchange regions of the first heat exchanger and between heat exchange regions of the second heat exchanger.

2. The arrangement of claim 1, further comprising a fourth fluid circuit and a third heat exchanger disposed for exchanging heat between a fluid of the fourth fluid circuit and the fluid of the third fluid circuit.

3. The arrangement of claim 2, further comprising a thermoelectric element arranged between heat exchange regions of the third heat exchanger.

4. The arrangement of claim 1, further comprising a first valve communicating with the first heat exchanger for controlling the fluid flow of the fluid of the third circuit through the first heat exchanger, a second valve communicating with the second heat exchanger for controlling the fluid flow of the fluid of the third circuit through the second heat exchanger, and a third valve communicating with the third heat exchanger for controlling the fluid flow of the fluid of the third circuit through the at least one third heat exchanger.

5. The arrangement of claim 2, further comprising a first valve communicating with the first heat exchanger for controlling the fluid flow of the fluid of the first circuit through the first heat exchanger, a second valve communicating with the second heat exchanger for controlling the fluid flow of the fluid of the second circuit through the second heat exchanger, and a third valve communicating with the third heat exchanger for controlling the fluid flow of the fluid of the fourth circuit through the third heat exchanger.

6. The arrangement of claim 5, wherein at least one of the valves is arranged upstream and/or downstream of the heat exchanger in terms of fluid flow.

7. The arrangement of claim 5, wherein at least one of the valves is a throttle valve.

8. The arrangement of claim 1, wherein the thermoelectric element is a Peltier element.

9. The arrangement of claim 1, wherein the thermoelectric element is electrically and/or electronically actuable.

10. The arrangement of claim 1, wherein the heat exchangers are arranged in a housing.

11. The arrangement of claim 1, wherein the heat exchangers are arranged in parallel or in series with respect one another in terms of the fluid flow of the third circuit.

* * * * *